Oct. 5, 1965

G. B. CARSON ETAL 3,209,996

APPARATUS FOR PREPARING DIGITAL RECORD

Filed Aug. 28, 1962

INVENTORS.
Gordon B. Carson,
BY Walter L. Starkey.
Wood, Herron & Evans.
ATTORNEYS.

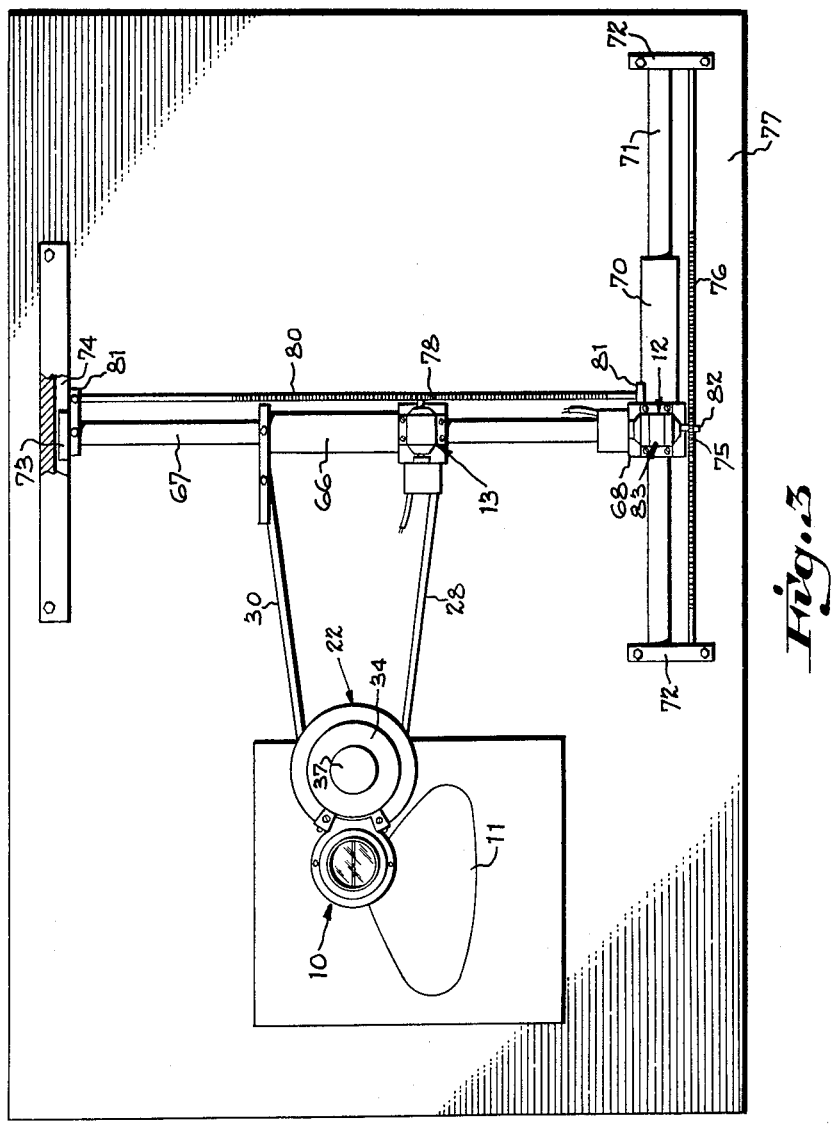

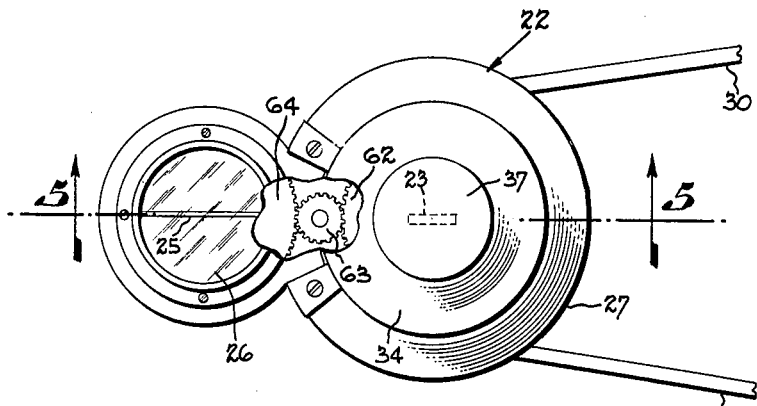
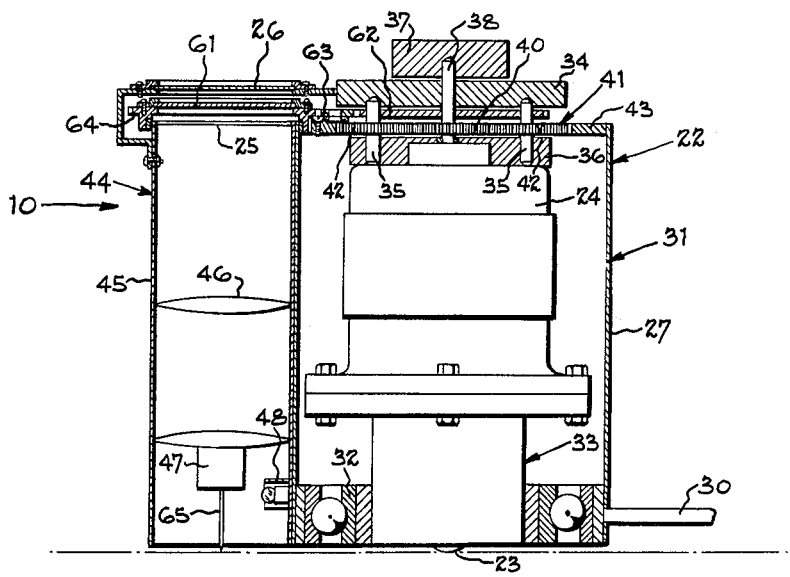

Oct. 5, 1965 G. B. CARSON ETAL 3,209,996
APPARATUS FOR PREPARING DIGITAL RECORD
Filed Aug. 28, 1962 9 Sheets-Sheet 4

INVENTORS.
Gordon B. Carson.
BY Walter L. Starkey.
Wood, Herron & Evans.
ATTORNEYS.

Oct. 5, 1965        G. B. CARSON ETAL        3,209,996

APPARATUS FOR PREPARING DIGITAL RECORD

Filed Aug. 28, 1962                                9 Sheets-Sheet 8

INVENTORS.
Gordon B. Carson.
BY Walter L. Starkey.
Wood, Herron & Evans
ATTORNEYS.

United States Patent Office 3,209,996
Patented Oct. 5, 1965

3,209,996
APPARATUS FOR PREPARING DIGITAL RECORD
Gordon B. Carson and Walter L. Starkey, Columbus, Ohio, assignors, by mesne assignments, to Selby International, Inc., Portsmouth, Ohio, a corporation of Delaware
Original application Mar. 7, 1957, Ser. No. 644,566, now Patent No. 3,083,580, dated Apr. 2, 1963. Divided and this application Aug. 28, 1962, Ser. No. 219,994
7 Claims. (Cl. 234—67)

This application is a division of our copending application Ser. No. 664,566 filed Mar. 7, 1957, now Patent No. 3,083,580.

This invention relates to apparatus by means of which a punched tape or other record is produced from a pattern; and is used to control a drive for effecting relative movement between a work carrying platen and a tool, so that the tool engages the work at predetermined intervals along the pattern.

The present invention is of particular utility when used in conjunction with apparatus for guiding movements of work in stitching machines, spot welding devices, heat and pressure machines for joining plastic materials, stapling machines, and the like. In these and other types of cyclically operable tools, it is frequently desirable not only to control the contour along which work is moved relative the tool, but also the amount the work is advanced between each successive actuation of the tool. In general, such devices are to be contrasted with various metal working machines such as, contour burning machines, and the like in which the only problem is to control the contour along which the work is moved relative to the tool, the rate of work advancement not being of critical importance.

In order to provide a fuller understanding of the present invention, it will be discussed in detail with reference to a stitching machine of the type used to fasten multithicknesses of material together, or to stitch a decorative pattern on a single thickness of material. It is to be understood that many of the problems inherent in the operation of such a device are also present in other types of equipment; and that some or all of the advantages provided by the present invention make it extremely useful for embodiment in other devices.

Stitching machines are used in large numbers in many industries, such as the shoe industry. At the present time, it is conventional in such commercial stitching operations to rely upon skilled operators who manually guide the articles to be stitched beneath the sewing machine head. Two problems result from this type of operation. In the first place, hand stitching, especially of complex decorative patterns of the type frequently used in women's shoes, introduces an excessively high labor cost. Furthermore, even skilled operators do not accurately reproduce the desired pattern with a uniform stitch length, so that the appearance of the finished article is not as attractive as the original design.

It is the principal object of the present invention to provide means for automatically guiding work relative to a tool, such as a stitching machine head so that the original pattern is accurately reproduced and a uniform stitch spacing is obtained. In accordance with the present invention, a record, such as a punched or magnetic tape is prepared from the original stitching pattern. This tape is then employed to control one or more automatic stitching machines so that the worktable, or platen, is automatically moved in accordance with the information stored on the tape to reproduce accurately the original pattern. Moreover, as explained below, the platen is shifted a substantially equal distance along the pattern between each successive needle penetration, so that not only does the stitching follow the desired pattern, but the stitches are of substantially the same length, thereby greatly enhancing the attractiveness of the stitched article.

In a plant utilizing the present apparatus, the operator merely loads and unloads material on the worktable, the work being automatically guided through the machine. Thus, a single, relatively unskilled operator can supervise the operation of several machines, thereby replacing the skilled operators previously required. Furthermore, the stitch pattern conforms much more closely to the desired pattern than when the work is shifted manually by an operator; and a much higher degree of uniformity is obtained in the finished goods.

In general, a stitching machine constructed in accordance with the present invention includes a stationary head supporting a conventional reciprocating needle. A worktable is mounted for universal movement beneath the needle. Two component drive mechanisms are provided, each drive being effective to control movement of the worktable along one of two perpendicular axes. By combining movements along the two axes, the worktable can be shifted in any desired direction to bring any point on the table into registry with the needle. Movement along each axis is effected in multiples of a small unit increment such as, for example, .005". Since the two corresponding axes of movement are at right angles to one another, the net, or resultant, movement of the worktable is the vector sum of the two component movements and its length is equal to the hypotenuse of the right triangle formed by the two component movements.

It is the concept of the present invention to shift the worktable along the pattern in a succession of movements; each movement taking place while the needle is out of engagement with the work and being constituted by component movements along each of the two axes. Each set of component movements has substantially the same vector sum or hypotenuse length. For example, if the desired stitch length (or hypotenuse length) is equal to 13 increments of movement, the platen is always shifted by means of one of the following pairs of component movements; it being understood that the increments of movement can take place along either axis: 0 and 13, 1 and 13, 2 and 13, 3 and 12, 4 and 12, 5 and 12, 6 and 11, 7 and 11, 8 and 10, or 9 and 9. The variation in stitch length due to the small differences in hypotenuse length resulting from these combinations is imperceptible. However, if for some particular application, still greater accuracy is desired, it can readily be obtained by increasing the number of increments of hypotenuse length and making each individual increment smaller.

One preferred form of apparatus constructed in accordance with the present invention for producing a record to control platen movement includes a curve follower which is adapted to trace a stitching pattern plotted to scale and oriented relative to two perpendicular axes corresponding to the axes of worktable movement. Starting from a predetermined point on the pattern, the tracing head moves along the pattern and actuates two coordinate signal generators which produce an electrical signal for each increment of movement along the axes. These signals are applied to binary counters which count and store the number of signals. As explained below, each of the signal generators is effective to indicate the direction along the axis in which the follower moves between signal pulses. The output signals from the binary counters are employed to condition tape punches for actuation. Additional signals from the binary adders are also applied to a stitch spacing control circuit which is effective to cause actuation of the conditioned punches to form one set of instructions on the tape whenever the two component movements corresponds to one of the selected pairs, such as one of those listed above. As soon as the instructions are punched in the tape, the binary counters are automatically reset to 0 to prepare them for further counting as the tracing head moves over the pattern.

When the tape or other record has been prepared indicating each of the successive movements required to completely traverse the pattern, the tape is inserted in a suitable reader adapted to produce electrical signals corresponding to the binary coded information stored in the tape. These electrical signals are decoded either electrically or mechanically and are used to actuate solenoids which control gears in the component drive units. These gears have different pitches so that depending upon which gear is engaged, the platen is driven from 0 to the maximum number of increments desired (13 in the embodiment discussed above).

One of the principal advantages of an installation of this type is that the tapes are simple to produce, are readily stored and easily inserted in the reading device. Thus, in a factory, such as a shoe factory, where a relatively small number of articles is made in accordance with each particular design, the use of automatic equipment is greatly facilitated, since no expensive and cumbersome cams or templates are required. Furthermore, one tape and reader provide electrical signals which can be used to control any number of machines. Moreover, the present apparatus is highly advantageous because of its adaptability to the production of products which vary in sizes and widths, such as shoes.

Another advantage of the present apparatus is that it provides positive displacement of the work platen so that no errors are introduced in work position due to inertia of the worktable and other moving parts. It is one of the important concepts of the present invention to substitute the readily controlled minor deviations in stitch length caused by variation in lengths of the hypotenuse for the substantial errors introduced in a servomechanism type device by the inertia of the worktable.

Moreover, the present apparatus is completely self-compensating so that minor errors introduced by variations in hypotenuse length, or by the fact that the curve follower has traversed a fractional increment when the tape is punched are automatically compensated for. Thus, not only is the placement error for each stitch limited to a predetermined maximum amount, but the total cumulative error after any number of stitches is also limited to this same small maximum.

A still further advantage of the present invention is that it provides means for stitching any pattern no matter how large or complex the pattern may be.

In addition to these advantages of the entire system, the preferred embodiment of many of the component units provide unique advantages which can be utilized in other types of equipment. For example, the coordinate signal generators of the present invention provide an indication not only of the distance but also of the direction traveled by the curve follower. More particularly, each signal generator includes three output leads, a pulse being produced in one of these leads for each increment of movement along the axis. The generator is constructed so that the sequence in which the pulses are produced in the various leads indicates the direction of movement along the axis.

The present binary counter is also highly advantageous since it automatically adds or subtracts each pulse from the number stored in the counter depending upon whether the sequence of the incoming pulses is positive or negative.

Another advantage of the binary counter is that when a negative sequence pulse is subtracted from 0, the counter automatically converts the number in the register to 1 and adds further negative sequence pulses so that negative numbers are indicated on an ascending number scale, i.e.: −1, −2, −3, etc.

A still further advantage of the present invention is that the gear units for driving the platen provide an extremely large force for shifting the platen and are effective to displace the platen a positive distance each time the gear unit is actuated so that no error in position is introduced by the platen's inertia or friction.

The modified form of gear unit is particularly advantageous because it also provides means for mechanically decoding the binary input signals to a digital output signal, thereby eliminating the need for an electrical decoder.

These and other objects and advantages of the present invention will be more readily apparent from a consideration of the following detailed description of the drawings illustrating a preferred embodiment of the invention.

In the drawings:

FIGURE 3 is a top plan view of one suitable form of pattern tracing apparatus;

FIGURE 4 is an enlarged top view, partially broken away of the tracing head shown in FIGURE 3;

FIGURE 5 is a cross-sectional view of the tracing head taken along line 5—5 of FIGURE 4;

General description

Figure 1:
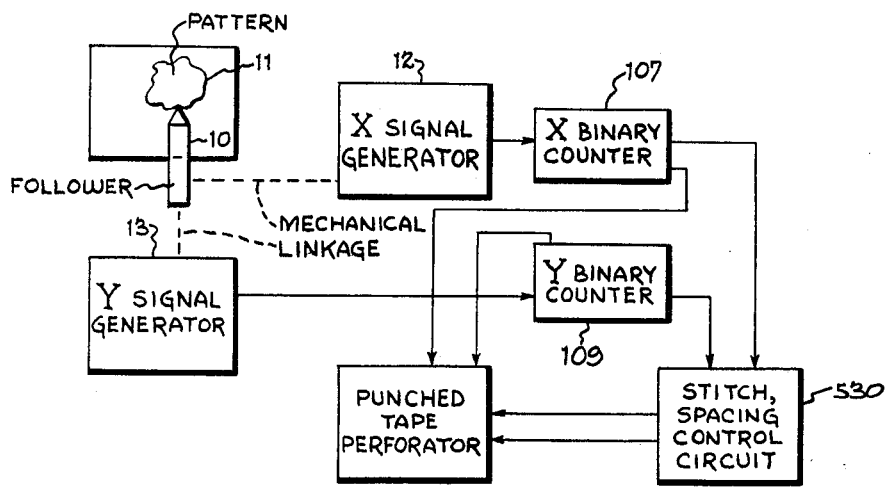
FIGURE 1 is a schematic block diagram of the mechanism and circuits for punching a control tape.

One preferred embodiment of the invention, as shown in the drawings and described in detail below, is an automatic stitching machine in which material is moved past a reciprocating needle in such a manner that irrespective of the contour being stitched, the stitches will be substantially uniformly spaced. From the foregoing discussion of the general principles of the invention and the following detailed description of this particular embodiment, these skilled in the art will readily comprehend the various modifications to which the invention is susceptible. For example, the control circuits and platen shifting mechanism described herein can readily be employed to shift work relative to any type of tool in which it is desirable to control the rate of work movement past the tool as well as the path along which the work is advanced. One such device is a seam welder; another is a heat sealing device for joining plastic material. An additional application of the circuits and mechanism of the present invention is to machines in which it is desirable to present a work piece to a tool so that a plurality of operations are performed at equispaced points along a predetermined pattern. For example, in spot welding it is frequently desirable to present work to welding electrodes so that equispaced welds are made along a particular pattern.

In general, an automatic stitching machine comprises a follower for tracking along a pattern and means for producing a record of the follower movements. This record is subsequently utilized to control apparatus for shifting a work holding platen beneath a reciprocating needle; the record being effective to cause the platen to reproduce the movements originally made by the follower in tracing the pattern.

FIGURE 1 discloses the general circuit arrangement for producing a record on an intelligence medium which can later be used to control movements of a worktable so that a workpiece will be moved beneath the tool in accordance with the desired pattern. As shown in FIGURE 1, a follower 10 is moved along the pattern 11 to be reproduced. The follower is mounted for universal movement along the plane of the pattern 11 and is connected by suitable linkages to two coordinate signal generators 12 and 13. Each coordinate signal generator is responsive to the component movements of the follower along one of two axes angulated with respect to one another. These axes are preferably disposed at right angles to one another, although a worktable device could be constructed using two coordinate axes disposed at some other angle.

In the embodiment shown, follower movements and subsequent corresponding movements of a work holding platen, are accomplished by combined movements along a first axis (horizontal in the drawings) referred to as an "X axis" and a second axis (vertical in the drawings) refrerred to as a "Y axis." Movements of the follower along each axis are divided into increments of a predetermined length; for example, .005 inch. Two signal generators are connected to the follower. Each signal generator is effective to generate a pulse for each increment of travel of the follower along the axis with which the signal generator is associated. Each coordinate signal generator is also effective, as explained in greater detail below, to indicate by the sequence in which pulses are produced the direction along the axis in which the follower is being shifted.

The output from each signal generator is applied to a binary counter. As explained in greater detail below, a binary counter is effective to count and store the number of pulses generated by each coordinate signal generator. A signal corresponding to this number is produced by the binary counter and is applied to a record forming device, in this embodiment, a tape perforator. In the perforator this signal is effective to condition a plurality of punches for actuation so that a tape will be punched in conformity with the number of pulses received by the counters.

The output of each of the counters is also applied to a stitch spacing control circuit, which functions to control the length of pattern along which the work is advanced between successive needle penetrations. That is, between successive needle penetrations the work carrying platen is shifted along each coordinate axis. The function of the stitch spacing control circuit is to regulate the length of the coordinate movements so that each set of corresponding "X" and "Y" movements causes the same length of pattern to pass beneath the needle. Specifically, the stitch spacing control circuit actuates the perforator punches whenever the combination of "X" increments and "Y" increments is equivalent to a movement along a predetermined length of pattern. In addition, the stitch spacing control circuit functions to reset the counters to prepare them for counting the signals caused by the next movement of the follower.

Figure 8:
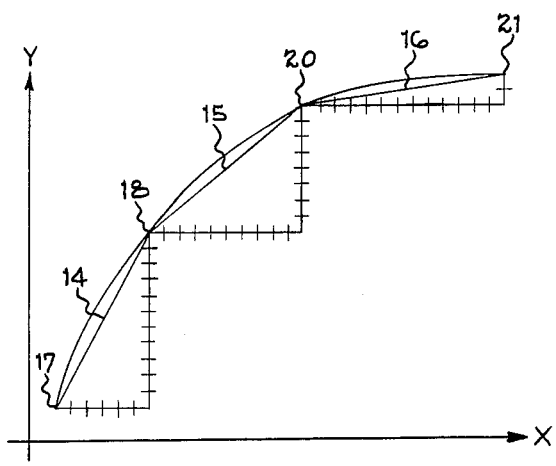
FIGURE 8 is a greatly enlarged segment of a pattern illustrating the way in which the pattern is broken up into increments of component movements.

It is felt that at this point, a brief reference to FIGURE 8 will help to clarify the function of coordinate signal generators 12 and 13, the binary counters and the stitch spacing control circuit. FIGURE 8 represents a greatly enlarged segment of a pattern 11 to be reproduced. If the stitch spacing or distance between successive stitch positions, or points where the needle penetrates the material, is held constant, the chordal distances 14, 15 and 16 must be equal. Each chordal distance forms the hypotenuse of a right triangle having sides parallel to the two coordinate axes. If each coordinate axis is considered as being divided into a large number of equal increments, there are many combinations of increments along the two axes which will yield substantially equal hypotenuses.

For example, assume that each increment of movement along the "X" and "Y" axis is equal to .005 inch and it is desired to stitch the pattern at sixteen stitches per inch; then between each successive stitch, or needle penetration, the work holding platen must be moved beneath the needle a distance such that .0625 inch of pattern length passes beneath the needle. The movement along each component axis can comprise from zero to thirteen increments of movement. When the vector sum (hypotenuse length) of these increments is equal to .0625 inch, the tape should be punched with instructions for effecting one set of movements of the worktable. That is, the tape should be punched so that the table will be caused to move along each of the axes a distance such that .0625" of pattern passes beneath the needle.

As shown in FIGURE 8, between stitch positions 17 and 18, the tape should be punched so that the worktable will be shifted six increments in the "X" direction and eleven increments in the "Y" direction. Similarly, the the tape should be punched to indicate ten increments of movement along the "X" axis and eight increments of movement along the "Y" axis between stitch positions 18 and 20. In a like manner, the tape should be punched to indicate thirteen increments of movement along the "X" axis and two increments of movement along the "Y" axis between switch positions 20 and 21. A table is produced below showing the different combinations of "X" and "Y" incremental movements which provide for substantially uniform spacing between successive stitch positions.

TABLE I

| X Increments | Y Increments | Total Movement |
| --- | --- | --- |
| 0. | 13 | .065 |
| 1. | 13 | .065 |
| 2. | 13 | .066 |
| 3. | 12 | .062 |
| 4. | 12 | .063 |
| 5. | 12 | .065 |
| 6. | 11 | .063 |
| 7. | 11 | .065 |
| 8. | 10 | .064 |
| 9. | 9 | .064 |
| 10. | 8 | .064 |
| 11. | 6 (or 7) | .063 |
| 12. | 3 (or 4 or 5) | .062 |
| 13. | 0 (or 1 or 2) | .065 |

It can be seen from the above table if no movement in the "X" direction is combined with thirteen increments in the "Y" direction, the pattern is moved a total of .065 inch; while if six increments of movement in the "X" direction are combined with eleven increments in the "Y" direction, the pattern is shifted .063 inch. Using the various combinations of increments in the table, the total variation in stitch length never exceeds .005 inch, which is an imperceptible deviation.

Of course, if for a particular application a greater uniformity is required, the pattern can be broken up into smaller increments as explained below. At any rate, in the embodiment shown, one function of the coordinate signal generators is to provide a pulse for every .005 inch of tracer movement along the coordinate axis with which the particular generator is associated. In addition, as explained below, the coordinate signal generators also provide information concerning the direction of movement along the axis.

Figure 2:
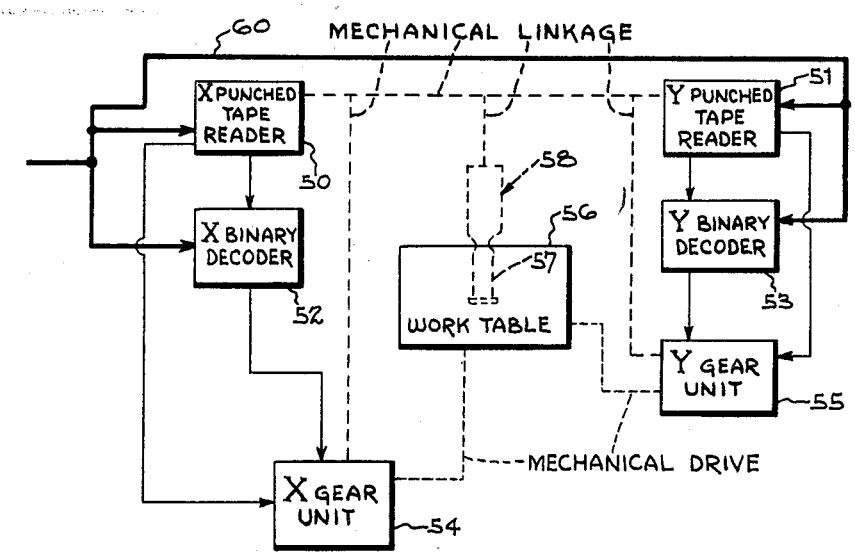
FIGURE 2 is a schematic block diagram of the mechanism and circuits for transforming the information stored on a punched tape to movements of a worktable.

After a punched tape has been perforated to indicate various sets of coordinate movements made by the follower in tracking over a pattern, it is used in conjunction with the apparatus shown in FIGURE 2 for automatically shifting a worktable beneath the head of a stitching machine to reproduce the movements previously made by the tracing head. The worktable, or platen, is shifted so that it makes one set of coordinate movements between each pair of successive needle penetrations.

As shown diagrammatically in FIGURE 2, when used to control platen movement the punched tape is inserted in an "X" tape reader 50 and a "Y" tape reader 51. In practice, these readers can be part of a single reading device. The readers function to produce electrical signals corresponding to information stored on the punched tape. In one embodiment these signals are fed to an "X" binary decoder 52 and a "Y" binary decoder 53 which transform the coded signals obtained from the tape readers into signals for operating solenoids within the "X" and "Y" gear units 54 and 55 of the two component platen drive assemblies. As explained in detail below in a second embodiment the reader output signals are employed to energize solenoids in a gear unit which incorporates mechanical means for decoding the signals. In either case, the "X" component drive assembly is effective to shift platen 56 in one direction (horizontal in the drawing) while the "Y" component drive is effective to shift the platen in a perpendicular direction (vertical in the drawing). By combining movements in each of these directions any point on the worktable can be brought into registry with head 57 of stitching machine 58.

Heavy line 60 indicates the power supply line for the tape readers and binary decoders; while the light solid lines indicate the path of signals from the readers to the decoders and ultimately to the gear units. As described below and indicated by dotted lines, the reader and gear units are synchronized through suitable mechanical linkages with the stitching machine, so that the worktable is shifted only while the needle is out of engagement with the work.

One preferred form of component drive for shifting a worktable the required number of increments along an axis to position the table for successive needle penetrations is shown in FIGURES 17 through 20. For the present purposes, however, it will suffice to say that each component drive assembly includes an input shaft turned in synchronism with the sewing machine spindle. A suitable device, such as a Geneva drive, transforms this motion into intermittent motion of a main drive worm which turns a predetermined portion of a revolution between each successive pair of needle penetrations. A gear drive interconnects the main drive worm and a power screw which actually shifts the worktable. The gear unit includes a plurality of solenoid controlled spindle worm gears which are driven by the main power worm and are selectively engageable with an output worm shaft which is connected to the power screw through a reversing mechanism, the function and operation of which is explained below.

The lead of each spindle worm varies; the spindle worm having the smallest lead is effective to cause the platen to be shifted one increment of movement in response to the rotation of the driving worm between successive needle penetrations. The next spindle worm has a lead twice as great, so that the platen is advanced two increments of movement; while the remaining worms are respectively effective to cause the platen to be shifted by three increments, four increments and so on. The solenoids which shift the spindle worms into operative engagement with the output worm shaft are energized by output signals from the "X" and "Y" binary decoders. Obviously only one solenoid is energized and one spindle worm is positioned for engagement with the output worm at any time.

Thus, when the table is to be shifted between stitch positions 17 and 18 of the pattern of FIGURE 8, the punched tape causes the "X" binary decoder to produce a signal for energizing the six increment spindle worm in the "X" gear unit and causes the "Y" binary decoder to energize the eleven increment spindle worm in the "Y" gear unit. Consequently, between the time that the stitching needle is withdrawn from the work at position 17 and the time that it again penetrates the work, the work holding platen is shifted six increments in the "X" direction and eleven increments in the "Y" direction so that point 18 of the work is located beneath the needle.

The various components of the record producing apparatus and the record controlled stitching apparatus will now be described in detail.

*Curve follower mechanism*

The curve follower mechanism 10 is best shown in FIGURES 3, 4 and 5. In the preferred embodiment, the curve follower is a semi-automatic type. That is, the tracing head 22 is provided with a driving wheel 23 and a motor 24 for frictionally driving the head over the pattern. However, the head is manually guided along the pattern by an operator who sights the pattern 11 between a pair of cross hairs 25 provided in disc 26.

More specifically, tracing head 22 comprises a cylindrical casing 27 rigidly secured to two elongated arms 28 and 30. A drive wheel assembly 31 is rotatably mounted within the casing by means of ball bearing races 32. The drive wheel assembly includes friction wheel 23 which is disposed for engagement with the pattern sheet and is rotatably driven from motor 24 through a right angle gear drive 33. This drive is not shown in detail since its construction constitutes no part of the invention.

The tracing head is steered by turning the drive wheel assembly within casing 27 to change the orientation of friction driving wheel 23. Rotating movement of the drive assembly is accomplished by manipulating either a high speed control or low speed control knob mounted on top of the motor.

The high speed turning means includes a large knob which is joined directly to the motor casing through pins 35 and annular disc 36 which is welded or otherwise mounted on the motor housing. The low speed control means comprises a small knob mounted on central pin 38. This pin carries sun gear 40 of planetary gear train 41. Sun gear 40 meshes with two planetary gears 42 mounted on pins 35 and the planetary gears in turn mesh with a ring gear 43 rigidly secured to the housing. Thus rotation of knob 37 causes rotation of the sun gear about pin 38 and rotation of the planetary gears around pins 35. The engagement of these gears with ring gear 43 causes pivotal movement of motor 24 and driving wheel 23.

The optical portion 44 of the tracing head includes a second tubular housing 45 secured to the first housing and supporting a lens system 46, a solenoid 47 and a light source 48. A ground glass viewing plate 26 including two parallel spaced guide hairs 25 is rotated beneath a clear glass dust plate 61 at the upper end of the optical cylinder. Guide hairs 25 are maintained parallel with the orientation of the drive wheel through a gear system including a drive gear 62 mounted on pins 35, an idler gear 63, and a gear ring 64 surrounding housing 45. Solenoid 47 carries a pin 65 which is driven into the pattern sheet whenever the solenoid is energized. As will be explained in greater detail below, the solenoid is energized to pierce the pattern at each stitch position. The solenoid thus provides a means for starting the pattern tracing operation over from a predetermined point on the pattern in the event that an error is made in tracing a portion of the pattern. This has the greater advantage of eliminating the need of retracing an entire pattern merely to correct an error made in following only a small portion of the pattern.

Mounting arms 28 and 30 carrying the tracing head are mounted for movement along two coordinate axes which extend perpendicular to one another. As shown, arms 28 and 30 are rigidly secured to a carriage 66 which is slidable along a cross bar 67 to provide movement in the vertical or "Y" direction. One end of cross bar 67 is mounted in a bracket 68 carried by sleeve 70, the sleeve being slidably mounted on a shaft 71 disposed at right angles to transverse shaft 67. Horizontal shaft 71 is carried by two mounting brackets 72—72 which are bolted or otherwise secured to the tracing mechanism. The opposite end of transverse shaft 67 is secured to a roller 73 which runs on a horizontal track 74 extending parallel to bar 71. Combined movements of the transverse shaft mounting means along the "X" axis and movements of sleeves 66 along the transverse shaft provide for universal movement of the tracing head over the pattern.

While this type of tracing mechanism is considered preferable for tracing a pattern of complex configuration, it will be understood that other forms of tracing apparatus can be used. For example, a completely manual tracer having a cross hair or stylus can be employed. Such a tracer has no driving wheel and is manually shifted along the pattern by the operator. Alternatively, a completely automatic tracer such as a conductive line follower, or a photoelectric line follower could be provided. As a still further alternative, a combination automatic-manual tracer could be employed, the tracer being driven automatically over relatively simple patterns, and manually over relatively complex ones. Since the construction of these various tracers is well known in the art and since their construction constitutes no part of the present invention, it is not considered necessary to illustrate them or describe them in detail here.

Coordinate signal generators

Since the "X" coordinate signal generator 12 and the "Y" coordinate signal generator 13 are identical, only one will be described in detail. Each coordinate signal generator is adapted to generate a voltage pulse for each increment of travel of the tracer head along the coordinate axis. As explained below, these pulses convey two pieces of information; namely, an indication of the distance traveled by the tracer head along an axis, and the direction in which the head is moved along that axis.

Each signal generator cooperates with a stationary rack extending parallel to the coordinate axis. Thus, the "X" coordinate generator 12 includes a pinion 75 disposed for cooperative engagement with rack 76 secured to mounting brackets 72—72 on base 77 parallel to horizontal rod 71. Similarly, "Y" coordinate signal generator 13 includes pinion 78 in engagement with rack 80 carried between arms 81—81 mounted at the ends of transverse shaft 67.

Pinion 75 of the "X" coordinate signal generator is mounted on shaft 82 of non-backlash gear unit 83. The exact construction of this gear unit constitutes no part of the present invention. One suitable form of gear unit is produced by Metron Instrument Company and is identified by that company as "Series 7 Anti-Backlash Motor Speed Changers." The output shaft 84 of the speed changer carries a perforated disc 85 which is pinned or otherwise rigidly secured to the shaft.

Disc 85 is provided with a plurality of small apertures or slits. In the embodiment shown in FIGURES 6 and 7, the disc is configured to form fifteen apertures arranged about the peripheries of three concentric circles. Five openings 86 are equally spaced about the circumference of the largest circle, while five openings 87 and five openings 88 are respectively equispaced about the circumference of the circles of intermediate and smallest diameter. The apertures on the two inner circles are displaced circumferentially to openings 86 so that radial lines passing through each of the openings 86, 87, and 88 are disposed at equal angles to one another.

The signal generator also includes three small light sources 90, 91 and 92 which are rigidly mounted in any suitable manner along a radical line disposed on one side of disc 85. Light source 90 is disposed for registry with openings 86 while light source 91 is disposed for registry with apertures 87 and light source 92 is disposed for registry with apertures 88. Three light sensitive elements such as phototubes 93, 94, and 95 are disposed on the opposite side of disc 85; these phototubes are respectively disposed in alignment with light sources 90, 91, and 92, so that light emitted by one of these sources and passing through an adjacent opening in the disc impinges upon the aligned phototube.

One electrode of each of the phototubes is connected to lead 96 which in turn is connected to light sources 90, 91, and 92 and a source of positive voltage 97. Electrodes 100, 101, and 102 of the phototubes are respectively connected to a positive voltage source 103 through registers 106, 105, and 104. Each of these latter electrodes is also connected to an input terminal of the "X" binary counter 107 through one of the leads 123, 124, or 125. In the embodiment shown the gear ratios of the rack and pinion, and speed changing unit are such that disc 85 is driven one-fifteenth of a revolution for every .005 inch of tracing head travel. Thus, each time the tracing head moves .005 inch along an axis a different aperture is brought into alignment with one of the light sources and phototubes, and a negative pulse is applied to the output lead connected to the phototube.

The sequence in which pulses are applied to the output leads of the three phototubes also provides an indication of the direction in which the tracing head is shifted along the axis. This can best be understood from a consideration of FIGURES 6 and 7. Suppose that in FIGURE 6, opening 87a is aligned with phototube 94 and light source 91, so that a signal is produced in output lead 124. If the signal generator is subsequently shifted upwardly in FIGURE 6, disc 85 will rotate in a counterclockwise direction and the next aperture to come into alignment with a phototube and light source will be aperture 88a in the inner row which will cause a pulse to occur in lead 125. If on the other hand, the signal generator is shifted downwardly, disc 85 is turned in a clockwise direction and the next aperture to be aligned following the alignment of aperture 87a is aperture 86a. This aperture is in the outer circle and when it registers with light source 90 and photo cell 93a pulse is produced in lead 123.

In general, it can readily be seen that whenever disc 85 is rotated in a counterclockwise direction one of the following combinations of pulses will occur: (1) a pulse in lead 124 followed by a pulse in lead 125; (2) a pulse in lead 125 followed by a pulse in lead 123; (3) a pulse in lead 123 followed by a pulse in lead 124. Conversely, if disc 85 is rotated in a clockwise direction in response to a downward movement one of the following pulse combinations will occur: (1) a pulse in lead 124 followed by a pulse in lead 123; (2) a pulse in lead 125 followed by a pulse in lead 124; (3) a pulse in lead 123 followed by a pulse in lead 125. The sequence of these pulses is used to cause the binary counter to add or substract as is more fully explained in the next section.

Figure 6:
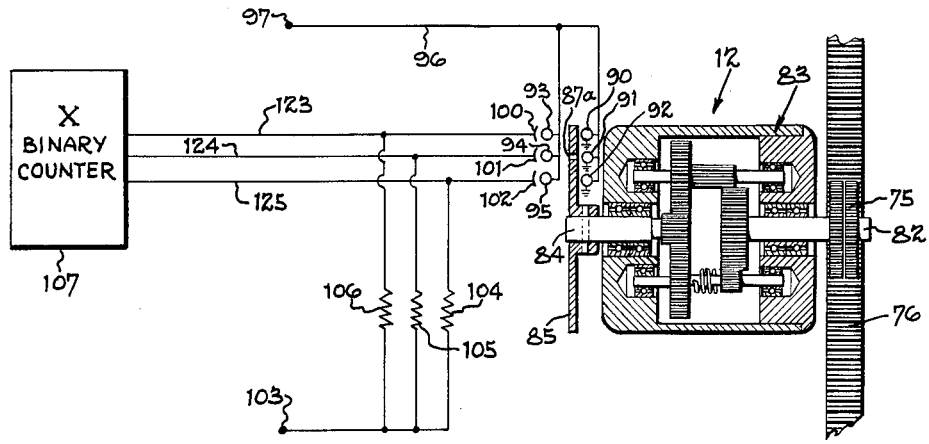
FIGURE 6 is a semi-diagrammatic view partially in section of one suitable form of coordinate signal generating unit.
Figure 7:
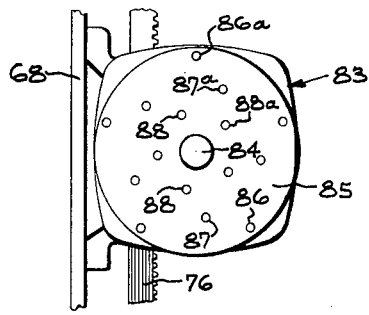
FIGURE 7 is a side view showing the perforated disc of a coordinate signal generating unit.

While the preferred form of coordinate signal generator shown in FIGURES 6 and 7 has many advantages such as, low friction, high stability, and so forth, it is contemplated that other forms of signal generators could be employed if desired. For example, a commutator type pickup, a capacitive pickup, or an inductive pickup having a movable core element, such as, a Schaevitz rotary transformer, could be employed. Since those skilled in the art are familiar with many such arrangements for generating pulses in accordance with the displacement of a member, it is not felt necessary to describe these other devices in detail.

Binary counters

In general, the function of the "X" and "Y" binary counters 107 and 109 is to count the number of pulses produced by the "X" and "Y" coordinate signal generators 12 and 13 to produce electrical signals corresponding to the total number of pulses, transformed into a binary code. More particularly, each counter is effective to add pulses produced by its associated signal generator when the tracing head is moving in one direction and to subtract pulses produced when the tracing head is moving in the opposite direction. Consequently, the resulting number stored in the counter equals the total number of increments which the tracing head is displaced at any given instant from its starting point at the beginning of the count.

In the following description, movement to the right along the "X" axis and upwardly along the "Y" axis will be arbitrarily taken as positive and movement in the opposite directions taken as negative. Thus, the "X" counter will add pulses when the tracing head moves to the right and will subtract pulses when the tracing head moves to the left. In the event that the net total of pulses is negative, the counter is effective to produce a "reverse" signal which is punched on a separate channel of the tape and results in the work platen being driven in the reverse or negative direction to duplicate the corresponding movement of the tracing head.

Before going into the details of construction of the counter, a brief description of the binary number system will be given. This system uses the number 2 as a base. Any integer is expressed as a series of the type $$a_n(2)^n + a_{n-1}(2)^{n-1} \ldots + a_2(2)^2 + a_1(2)^1 + a_0(2)^0$$

The various coefficients $a_0$, $a_1$, $a_2$, $a_3$, etc. take on either of two values, namely 1 or 0. Thus, the number 9 is equal to $1(2)^3 + 0(2)^2 + 0(2)^1 + 1(2)^0$, and is expressed in binary notation as the number 1001. The following table shows the relationship between the numbers 0–15 expressed in the decimal system and in the corresponding binary notation.

| Decimal system | Binary system |
| --- | --- |
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

It is apparent from the above table that four binary digits are sufficient to express any number from 0 to 15. Many different systems have been proposed for representing these binary digits. In the present device a digit, or coefficient value of one, is represented by a positive voltage while a coefficient value of 0 is represented by the lack of such voltage. More specifically, in the counter shown in FIGURES 13 and 14 the output signals of the counter are applied to leads 115, 116, 117 and 118. A positive voltage in output line 115 represents $a_0 = 1$, and a positive voltage in line 116 represents $a_1 = 1$; while a positive voltage in line 117 represents $a_2 = 1$ and a positive voltage in line 118 corresponds to $a_0 = 1$. The number 9, or 1001, would thus be indicated by a positive voltage in lines 115 and 118.

Figure 13:
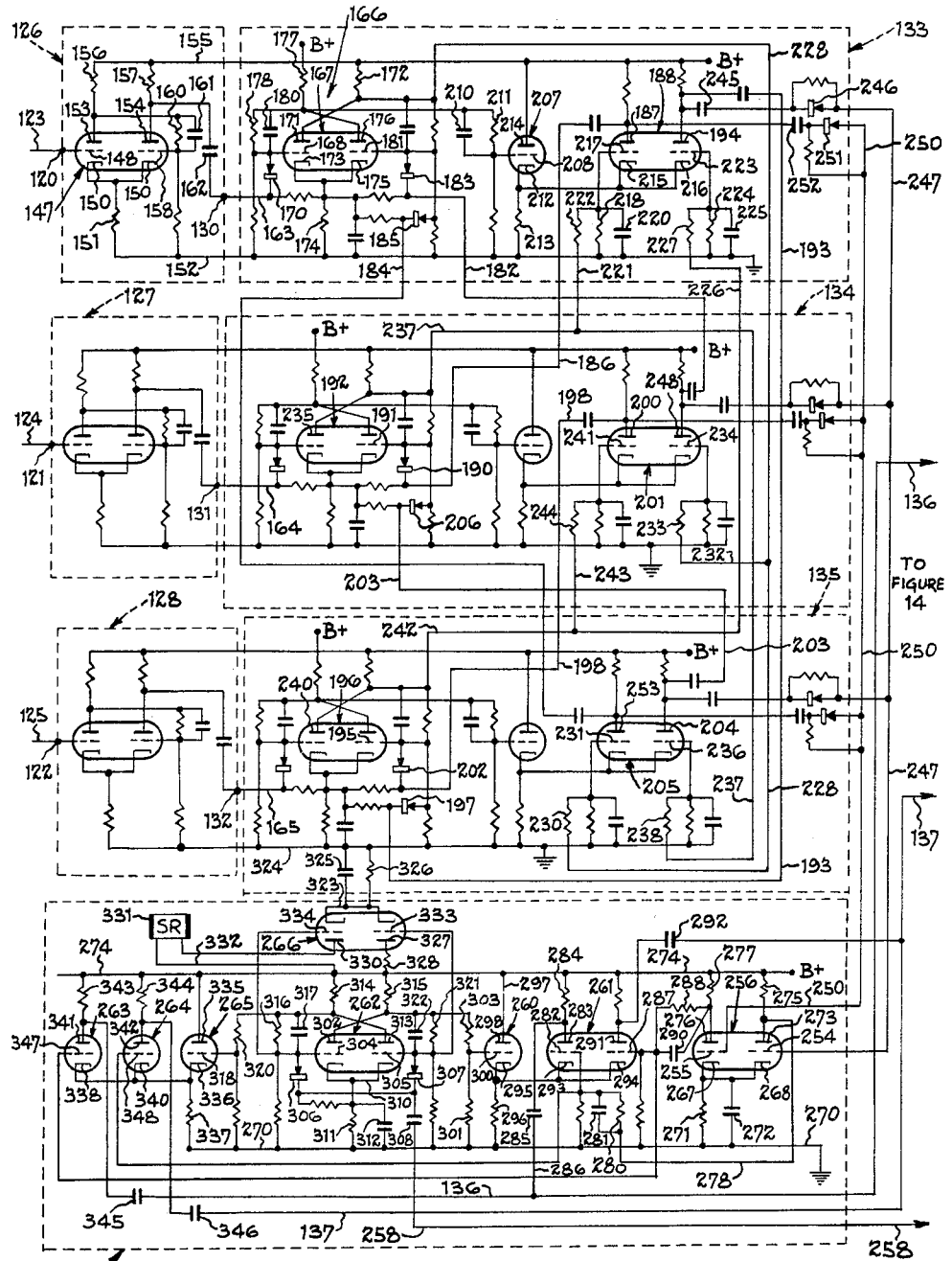
FIGURES 13 and 14 are schematic circuit diagrams of a preferred form of binary adder and subtracter.
Figure 14:
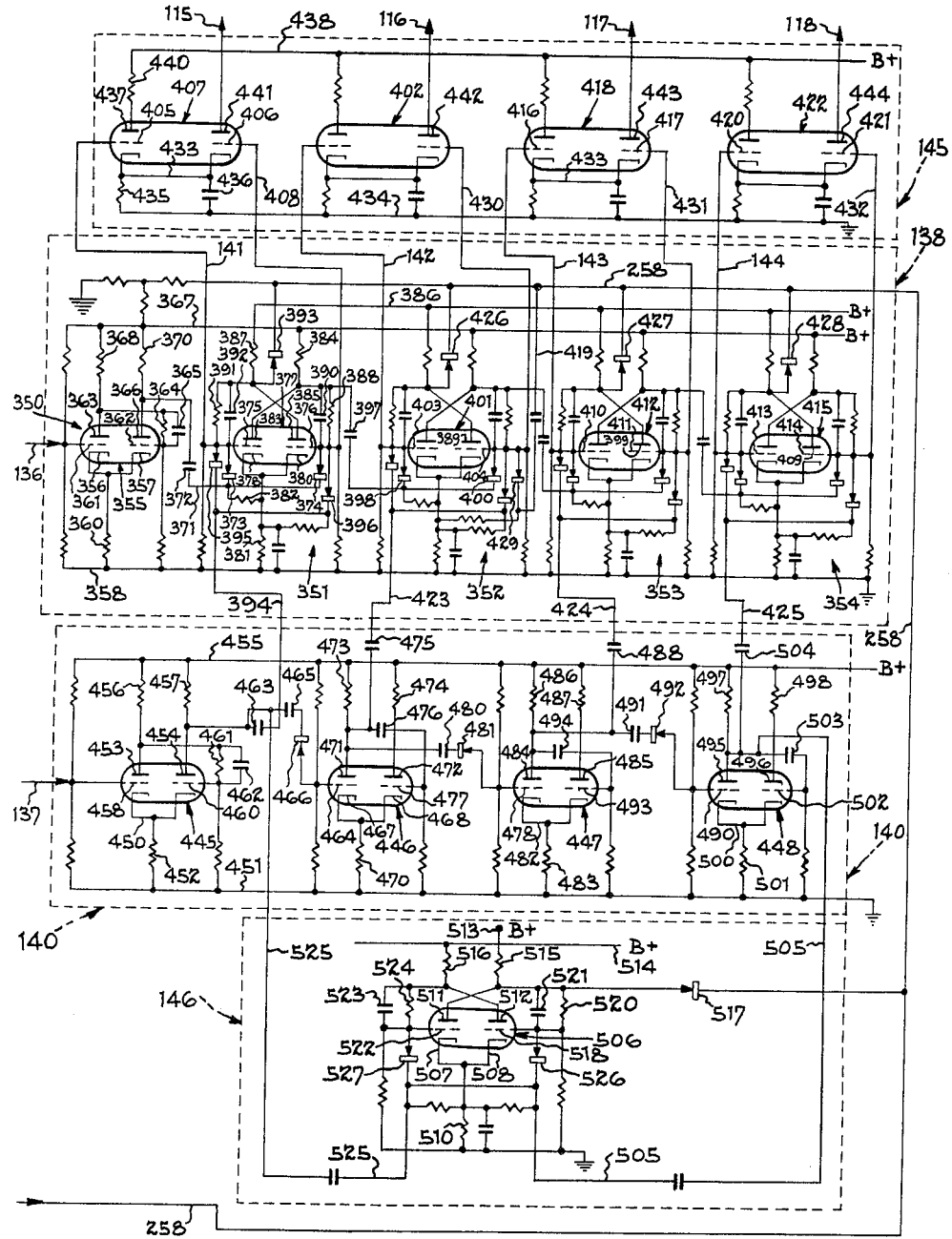

Since the construction of both the "X" and "Y" binary counters 107 and 109 is the same, only the "X" binary counter 107 will be described in detail. The "X" binary counter is provided with three input terminals 120, 121, and 122 respectively connected to output leads 123, 124, and 125 of the "X" coordinate signal generator 12. Each of the input terminals is connected to a pulse former network 126, 127, and 128. In FIGURE 13 each of these pulse former networks has been enclosed in a dotted line; similar dotted lines have been used to enclose the other units of the binary adder.

Each of the pulse former networks functions to convert an irregular signal received from the coordinate signal generator to a square wave signal at output terminals 130, 131, and 132. The output from each of the pulse formers is applied to its associated memory unit 133, 134, or 135. As explained below, these memory units cooperate with switching unit 126 to produce an output pulse in lead 136 when the register carries a positive number and the sequence of pulses from the coordinate signal generators indicates a movement in the positive direction; and to produce a pulse in line with 137 when the sequence of pulses produced by the coordinate signal generator indicates a unit of movement in the negative direction. The memory units and switching unit are also effective to reverse the leads to which the signals are applied when the register carries a negative number.

Lead 136 is connected to binary adder or register 138; while lead 137 is connected to a subtracting unit 140. Binary adder 138 is a conventional flip-flop binary adder adapted to produce pulse in lines in 141, 142, 143, and 144 respectively corresponding to the addition of 1, 2, 4, and 8. The pulses appearing in these lines are applied to a slave unit 145, the slave unit controlling the energization of output lines 115, 116, 117, and 118 of the binary counter.

In addition to these units the binary counter includes a blocking unit 146 which functions, as explained below, to insure that the number 2 is not added to the binary adder when the number 15 is momentarily present in the counter as a transient incidental to the subtraction of other numbers.

More specifically, pulse former networks 126, 127, and 128 are identical with one another; consequently, only network 126 will be described in detail. As shown, pulse former network 126 includes a double triode 147 having a first control grid 148 connected to input terminal 120. Cathodes 150 of this tube are grounded through resistor 151 and ground line 152. Plates 153 and 154 are respectively connected to B+ line 155 through resistors 156 and 157. Plate 153 is also tied to the second control grid 158 of tube 147 through resistor 160 and capacitor 161. The output signal of pulse former 126 is taken from plate 154 through capacitor 162. It will be appreciated that a negative pulse applied to terminal 120 causes the normally conductive left half of the tube to become non-conductive and the right half of the tube to become conductive, so that a negative pulse or output signal is produced in lead 130. The output signals of pulse formers 127 and 128 are similarly applied to leads 131 and 132.

Leads 163, 164, and 165 are respectively connected to memory units 133, 134, and 135. Since these memory units are identical with one another, only unit 133 will be described in detail. Memory unit 133 comprises a bi-stable multivibrator, or flip-flop, section 166 including a double triode tube 167. One grid 168 of this tube is connected to input line 163 through a rectifier 170. Plate 171 associated with this grid is connected to B+ line 155 through resistor 172; while cathode 173 is connected to ground line 152 through resistor 174. A second cathode 175 of tube 167 is tied to cathode 173. Anode 176 associated with cathode 175 is joined to a B+ voltage source through resistor 177 and is connected to grid 168 through the combination of resistor 178 and capacitor 180. Grid 181 is joined to lead 182 through rectifier 183 and to lead 184 through rectifier 185. As explained below, leads 182 and 184 are respectively connected to memory units 134 and 135 and are adapted to conduct pulses for erasing the memory in unit 133 whenever either of the latter two units receive a signal from the coordinate signal generator.

Similar connections are provided for erasing the memory in units 134 and 135 when memory unit 133 is pulsed. These latter connections include line 186 connected to plate 187 of double triode 188. Line 186 is joined through rectifier 190 to control grid 191 of tube 192 in memory unit 134. Also, a lead 193 joins plate 194 of tube 188 to grid 195 of tube 196 in memory unit 135. A rectifier 197 is placed in this line to prevent a positive pulse from reaching the grid. Similar connections are also provided between sections 134 and 135. These connections include a lead 198 joining plate 200 of tube 201 and control grid 195 of tube 196 through rectifier 202. Another connection 203 joins plate 204 of tube 205 in section 135 with grid 191 of tube 192. This line is provided with a rectifier 206.

A second subsection of unit 133 is a gating section and includes a cathode follower tube 207. Grid 208 of this tube is connected to plate 176 of tube 167 through capacitor 210 and resistor 211. Cathode 212 of triode 207 is connected to ground line 152 through resistor 213; and anode 214 of this tube is connected to B+ line 155. Cathode 212 is also connected to common cathodes 215 and 216 of double triode 188. One control grid 217 of tube 188 is joined to ground line 152 through resistor 218 and capacitor 220; this grid is also connected to input lead 221 from memory unit 134 through resistor 222. The other control grid 223 of this tube is similarly connected to ground line 152 through the combination of resistor 224 and capacitor 225 and is joined to input lead 226 from memory unit 135 through resistor 227.

Similar connections are made between unit 133 and tubes 201 and 205 of units 134 and 135. More particularly, plate 171 of tube 167 is connected through line 228 and resistor 230 to control grid 231 of tube 205 in unit 135. This plate is also connected through line 228, conductor 232 and resistor 233 to grid 234 of tube 201. In a similar manner, plate 235 of tube 192 is connected to control grid 236 of tube 205 through lead 237 and resistor 238. Also, plate 240 of tube 196 is placed in circuit connection with control grid 241 of tube 201 through lead 242, conductor 243 and resistor 244.

The second plate 194 of double triode 188 is joined through capacitor 245 and rectifier 246 to an output line 247 which is similarly connected to plates 248 and 204 of tubes 201 and 205 in memory units 134 and 135. In a like manner, plate 187 is connected to output line 250 through rectifier 251 and capacitor 252. Plates 200 and 253 of tubes 201 and 205 are also joined to this line through a series connected capacitor and rectifier. Output lines 247 and 250 are respectively connected to control grids 254 and 255 of tube 256 in switching unit 257.

In addition to input lines 247 and 250, the switching unit is connected to an input line 258 adapted to receive a pulse from register unit 138, whenever a number is subtracted from the register so that the number present in the register goes from 0 to 15. Before discussing the circuit of switching unit 257 in detail, it is believed that a brief description of the characteristics of the counter will be helpful in understanding its function. It will readily be appreciated by those skilled in the art that it is desirable that the number within register unit 138 always indicates the number of increments which the tracing head, or stylus has moved from its starting position in tracing the pattern contour. Since the stylus can move in either of two directions along each axis, the number within this register can be either positive or negative.

If the number within the counter is positive, a further positive pulse reaching the binary counter must be added by applying a pulse to input lead 136 of the register unit. Similarly, a pulse indicating movement in the negative direction must be applied through lead 137 to substracting unit 140 so that one unit will be subtracted from the register. This register counts from 0 to 15; and because of the electric circuitry in the register as a succession of numbers is subtracted from the register, it will finally read 0. And then if one more unit is subtracted, the register will inherently indicate 15. It is extremely desirable, however, to indicate the distance along the negative (downward in FIGURE 8) direction from the starting point by an ascending sequence of numbers coupled with a negative signal for the reversing solenoid.

Therefore, whenever a unit is subtracted from the register to bring the register count from 0 to 15, it is necessary that three things be done. In the first place, it is necessary that the count in the register be changed from 15 to 1. As explained later, this is done by circuitry which produces a negative pulse in lead 258 and thereby adds two to the register changing the count from 15 to 1. Secondly, it is necessary that the connections between the output leads of memory units 133, 134, and 135 be reversed so that further movement in the negative direction causes pulses to be applied to lead 136 and added in the register while pulses caused by motion in a positive direction are supplied to lead 137 of subtracting unit 140 whereby these pulses are subtracted from the register. Finally, when the register number goes from 0 to 15 in a negative direction, the reverse solenoid must be energized to indicate that the platen drive is to be driven in the reverse direction along the coordinate axis.

Switching unit 257 is effective to perform the second and third functions described above. That is, switching unit 257 is effective to reverse the connections from memory units 133, 134, and 135 to the binary adding and subtracting units. The switch unit is also effective to control the energization of the reverse solenoid so that that solenoid is energized whenever a negative number is in the register.

More particularly, switch unit 257 comprises a phase reversing section including tube 256, a first gating section including tubes 260 and 261, a memory section including tube 262, a second gating section including triodes 263, 264, and 265, and a flip-flop section including tube 266 for controlling the energization of the reversing solenoid SR.

Tube 256 is a double triode having common cathodes 267 and 268 connected to ground line 270 through resistor 271 and capacitor 272. Plate 273 of this tube is connected to B+ line 274 through resistor 275; while plate 276 is connected to the B+ line through resistor 277. Plate 273 is also joined through connector 278, resistor 280 and capacitor 281 to grid 282 of tube 261. Anode 283 associated with this grid is connected to B+ line 274 through resistor 284 and is connected to output line 136 through capacitor 285 and lead 286. A second control grid 287 of tube 261 is connected to plate 276 of tube 256 through resistor 288 and capacitor 290. Plate 291 associated with this grid is connected through capacitor 292 to output line 137. Common cathodes 293 and 294 of tube 261 are tied to cathode 295 of cathode follower tube 260. This latter cathode is joined to ground line 270 by resistor 296. Conductor 297 interconnects plate 298 of tube 260 and B+ line 274. Control grid 300 of tube 260 is grounded through resistor 301 and is connected to plate 302 of tube 262 through resistor 303. Tube 262 is a double triode and includes grids 304 and 305 connected to input line 258 through rectifiers 306 and 307 and capacitor 308. Common cathodes 310 of tube 262 are joined to ground line 270 through resistor 311 and capacitor 312. Plate 302 and plate 313 are supplied with B+ voltage through resistors 314 and 315.

Plate 313 is joined to grid 304 through the parallel combination of resistor 316 and capacitor 317; and is joined to control grid 318 of tube 265 through resistor 320. Plate 302 is similarly joined to control grid 305 through the parallel combination of resistor 321 and capacitor 322.

Tube 266 includes common cathodes 323 which are connected to ground line 324 through capacitor 325 and resistor 326. Anode 327 of this tube is connected to B+ line 274 through resistor 328. Plate 330 is connected to a terminal of reversing solenoid 331 while the other terminal of that solenoid is joined through lead 332 to B+ line 274.

Control grid 333 of tube 266 is joined to grid 305 of tube 262. Consequently, it is adapted to receive pulses from input line 258. Grid 334 of tube 266 is similarly connected to grid 304 of tube 262 and is likewise adapted to receive pulses from input line 258.

Tube 265 is a cathode follower tube having a plate 335 connected to B+ line 274 and a cathode 336 joined to ground line 270 through resistor 337. Cathode 336 is also tied to cathodes 338 and 340 of tubes 263 and 264. Plates 341 and 342 of these tubes are respectively joined to B+ line 274 through resistors 343 and 344. Plate 341 is connected to output lead 136 through capacitor 345; while plate 342 is connected to output lead 137 through capacitor 346. Control grids 347 and 348 are joined to grids 287 and 282 of tube 261.

Register unit 138 is connected directly to output line 136 of the switching unit. This register includes a pulse former subsection 350 and four bi-stable multivibrators, or flip-flop subsections 351, 352, 353, and 354. More specifically, pulse former subsection 350 is a square wave generator adapted to convert the signal received from line 136 to a square wave signal for actuating the flip-flop subsections of the register unit. The pulse former network comprises a double triode 355 having common cathodes 356 and 357 connected to ground line 358 through resistor 360. The first control grid 361 of this tube is connected to line 136, while the second control grid 362 is tied to plate 363 through the combination of resistor 364 and capacitor 365. Plates 363 and 366 are connected to B+ line 367 through resistors 368 and 370. The output signal of the pulse former is applied to lead 371 through capacitor 372.

Lead 371 provides an input signal to the first flip-flop subsection 351 of the register. This lead is connected through rectifiers 373 and 374 to control grids 375 and 376 of double triode 377. Cathodes 378 and 380 of this tube are grounded through resistor 381 and are connected to line 371 through bypass resistor 382. Plate 383 of tube 377 is connected to B+ line 367 through resistor 384, while plate 385 is connected to B+ line 386 through resistor 387. Plate 383 is also connected to grid 376 through the parallel combination of resistor 388 and capacitor 392. Plate 385 is additionally connected to line 258 through rectifier 393. In addition to the signals from pulse former subsection 350, flip-flop section 351 is also connected to output lead 394 of subtracting unit 140, this output lead being connected to grids 375 and 376 through rectifiers 395 and 396. One output signal of section 351 is taken from plate 383 and is applied through capacitor 397 and rectifiers 398 and 400 to the grids 403 and 404 of double triode 401 of section 352. The same signals applied to grids 375 and 376 are also applied to grids 405 and 406 of tube 407 in slave unit 145 through leads 141 and 408.

Since sections 352, 353, and 354 are identical with section 351, these sections will not be described in detail. It is to be noted however, that each of the grids, of section 352 is joined to the corresponding grid of tube 402 in slave unit 145. Grids 410 and 411 of tube 412 in section 353 and grids 413 and 414 of tube 415 in section 354 are similarly joined to grids 416 and 417 of tube 418 and grids 420 and 421 of tube 422 in the slave unit. Thus, slave unit 145 is connected to output leads 141-144 and 408, 430, and 432 of the register unit in such a manner that tubes 407, 402, 418, and 422 are in the same relative state of conduction as tubes 377, 401, 412, and 415 of the register unit.

Subsections 352, 353, and 354 are also respectively connected to input leads 423, 424, and 425 from subtracting unit 140. Moreover, plates 389, 399, and 409 of tubes 401, 412, and 415 in each of these sections are joined to line 258 through rectifiers 426, 427, and 428. Output leads 115-118 of the slave unit are directly connected to the solenoids of the tape perforating device. The interposition of slave unit 145 between these solenoids and register unit 138 prevents interference due to the solenoids inductance, with the circuit of register 138.

Tubes 407, 402, 418, and 422 are double triodes, each having common cathodes 433 connected to ground line 434 through a resistor 435 and capacitor 436. One plate 437 of each of these tubes is connected to B+ line 438 through a resistor 440. Plates 441, 442, 443, and 444 of each of the tubes are joined respectively to output leads 115, 116, 117, and 118.

Subtracting unit 140 is connected to input lead 137. This unit is effective to subtract one unit from the register by sequentially pulsing leads 394, 423, 424, and 425; which sequential pulsing corresponds to adding the number 1111 (or 15) to the register unit.

Subtracting unit 140 includes double triodes 445, 446, 447, and 448. Tube 445 includes common cathodes 450 which are connected to ground line 451 through resistor 452; and plates 453 and 454 which are joined to B+ line 455 through resistors 456 and 457. Tube 445 also includes a first control grid 458 connected to line 137 and a second control grid 460 tied to plate 453 through the parallel combination of resistor 461 and capacitor 462. An output signal from plate 454 is applied to lead 394 through capacitor 463 and to grid 464 of tube 446 through capacitor 465 and rectifier 466.

Cathodes 467 and 468 of tube 446 are grounded through resistor 470 while plates 471 and 472 of this tube are connected to B+ line 455 through resistors 473 and 474. An output signal is taken from plate 471 and is applied through capacitor 475 to lead 423 and through capacitor 476 to control grid 477. An output signal from this plate is also applied to grid 478 of tube 447 through capacitor 480 and rectifier 481.

Tube 447 has connections similar to those of tube 446 and includes common cathodes 482, which are grounded through resistor 483; plates 484 and 485 connected to B+ line 455 through resistors 486 and 487. Plate 484 is connected to line 424 through capacitor 488 and to grid 490 of tube 448 through capacitor 491 and retcifier 492. This plate is also joined to control grid 493 of tube 447 through capacitor 494.

Double triode 448 includes plates 495 and 496 connected to B+ line 455 through resistors 497 and 498; and common cathodes 500 grounded through resistor 501. A second control grid 502 of this tube is joined to plate 495 through capacitor 503. Plate 495 is also connected to line 425 through capacitor 504, and to an output line 505 connected to blocking unit 146.

Blocking unit 146 includes a flip-flop circuit comprising double triode 506 having cathodes 507 and 508 grounded through resistor 510, and anodes 511 and 512 respectively connected to B+ voltage sources 513 and 514 through resistors 515 and 516. Plate 511 of this tube is connected to line 258 through rectifier 517 and to grid 518 through resistor 520 and capacitor 521. Plate 512 is similarly connected to grid 522 through capacitor 523 and resistor 524. Input signals to these grids are applied through leads 525 connected to plate 454 of tube 445 in the subtracting unit and lead 505 connected to plate 495 of tube 448 in that unit. Rectifiers 526 and 527 are placed in the grid circuits to insure that only negative pulses actaute the grids.

The operation of the binary counter will be best understood by reference to a description of a typical input pulse sequence. Assume that a pulse has previously been received through line 125 and that a pulse then occurs in line 123. As explained previously, this corresponds to movement in the positive direction along the "X" axis. Prior to the time that the pulse is received at terminal 120, the negative pulse received at terminal 122 will have caused the output of pulse former 128 to change from B+ downward. The condenser coupling between this unit and memory section 135 applies a square wave negative pulse to an input grid of tube 196 which activates memory tube 196. This negative pulse causes the right-hand section of tube 196 to conduct and the left-hand section to stop conducting.

Plate 240 in the left-hand section of tube 196 is connected to grid 223 in memory unit 133. Grid 217 of tube 188 which is connected to plate 235 in memory unit 134 is below the potential of grid 223; since in the manner explained below, the input signal applied to terminal 122 erased the memory in unit 134 with the result that the left-hand section of tube 192 is made conductive reducing the potential of plate 235 and consequently of grid 217. To summarize, the previous input pulse at terminal 122 erased the memory in sections 133 and 134 if the memory of these sections was previously activated, and activated the memory of unit 135, thereby causing grid potential 223 to be greater than grid potential 217 of tube 188 in memory unit 133.

When an input signal is received at terminal 120 from line 123, that negative signal is applied to grid 148 of tube 147. Normally, the left-hand section of tube 147 is conductive so that the plate voltage of this section is considerably below B+ and the cathode potential is above ground potential. Due to its connection with plate 153, grid 158 is below cathode potential so that the right-hand section of the tube is not conductive. However, when the negative pulse from terminal 120 is applied to grid 148, the potential of plate 153 rises and the potential of cathode 150 drops. This causes the potential of grid 158 to rise and the right-hand section of tube 147 to start conducting. As this tube starts conducting, the potential of common cathodes 150 rises, further reducing the current flow in the first section until the right-hand section of the tube is in a conductive state and the left-hand section is not conductnig. Tube 147 will remain in this condition until the negative pulse is removed from terminal 120. The effect of this operation is to produce a negative square wave at terminal 130.

This square wave is applied to grid 168 of tube 167 in memory unit 133. This negative pulse causes the conductive states in tube 167 to change so that the left-hand section does not conduct while the right-hand section does conduct. Further negative or positive pulses applied to lead 163 will not further change in the conductive states of tube 167. Thus, tube 167 functions as a memory tube storing the negative pulse originally applied to grid 168 and the memory of this tube cannot be erased, i.e.: the tube cannot be returned to its original states of conduction until a negative pulse is applied to grid 181. When the right-hand section of tube 167 becomes conductive there is a reduction in potential of plate 176 of the right-hand section which, in turn, reduces the grid potential of cathode follower 207.

When there is a relatively large positive bias on grid 208 of tube 207, the potential of cathode 212 becomes very positive; nearly equal to the grid potential. Cathodes 216 and 215 of tube 188 are also at a high potential. As a result, only the cathode follower is in a conductive state. When the potential of grid 208 is reduced by the signal received from plate 176, only the right-hand section of tube 188 having a positive grid signal becomes conductive. The lowers the potential of plate 194 which applies a signal to grid 195 of tube 196, thereby erasing the memory in that tube. The negative pulse produced at plate 194 is also applied through lead 147 to grid 254 of tube 256 in switching unit 257. As explained below, this latter signal is switched to either lead 136 of the binary counter or lead 137 of the subtracting unit in accordance with whether the number in the binary counter is positive or negative. In a similar manner, if a negative sequence of pulses occurs; for example, an input pulse in lead 124 followed by a pulse in lead 123, an output signal from memory unit 133 will occur at plate 187. This negative pulse will erase the memory of tube 192 of unit 194 and will apply an input signal to grid 255 of tube 256 in switching unit 257.

If the number within register unit 138 is positive, the left-hand section of memory flip-flop tube 262 is conducting. As explained below, when the sign of the number in the register is changed, a negative pulse is produced in line 258 causing tube 262 to change conductive states. This same pulse is also applied to the grids of tube 266 and is effective to cause that tube to change conductive states energizing the reversing solenoid SR. Flip-flop tube 262 controls the cathode potential of the gate tubes 263, 264, and 261.

If the register number is positive, the left-hand section of tube 262 is conductive so that the potential of cathodes 293 and 294 of tube 261 is lower than the potential of cathodes 338 and 340. With the switching unit thus conditioned, the positive sequence pulse applied to grid 254 produces a positive pulse at plate 273 which is applied to grid 282 of tube 261 and grid 348 of tube 264. Since the left-hand gate section including tube 264 is deactivated because of its high cathode potential, there is no output signal from this gate section. On the other hand, the positive pulse applied to grid 282 produces a negative pulse at plate 283 which is applied through line 136 directly to register unit 138.

If, instead of a positive sequence of pulses, a negative sequence of pulses is applied to the binary counter, the signal produced in the memory units will be applied to grid 255 of tube 256. This produces a positive signal on plate 276, which is connected to grid 287 of tube 261 and grid 347 of tube 263. If the number in the register is positive, a negative pulse will be produced at plate 291 which will be applied through line 137 to subtracting unit 140 causing 1 to be subtracted from register 138. In a similar manner, if the register contains a negative number a positive sequence pulse applied to grid 254 will cause an output signal to be applied to the subtracting unit 140 through lead 137; while a negative sequence pulse applied to grid 255 will cause an output to be applied to register unit 138 through lead 136.

For purposes of illustration, suppose that register unit 138 is storing the number 3 (0011 in binary notation). Then the pulse in line 123 described above ultimately produces a pulse in line 136 of the register unit. When storing the number 0011 the right-hand section of tube 377 is conducting and the right-hand section of tube 401 is conducting, while the left-hand sections of tubes 412 and 415 are conducting. Also the right-hand sections of tubes 407 and 402 in slave unit 145 are conducting so that signals appear in lines 115 and 116.

The pulse in lead 136 causes a negative square wave pulse to be applied to grids 375 and 376 causing tube 377 to change conductive states, whereby the left-hand half of the tube is made conductive. This results in a negative pulse at plate 383 which pulse is applied to grids 403, 404 of tube 401 causing that tube to reverse its conducting states. Consequently, the left-hand section of this tube becomes conductive producing a second negative pulse which is applied to grids 410, 411 of tube 412 causing that tube to reverse conductive states so that the right-hand triode becomes conductive and a positive signal is applied to grid 417 of tube 418, causing the right-hand half of that tube to become conductive so as to produce an output signal in line 117. No signal is applied to the grids of tube 415. Thus, it can be seen that the positive pulse applied to lead 136 causes output lines 115 and 116 to be deenergized and line 117 representing 0100, or 4, to be energized.

If a negative pulse is applied to subtracting unit 140, this negative pulse produces a positive signal on plate 453 and a negative signal at plate 454. The negative pulse from plate 454 is applied to grid 464 of tube 446 and causes the potential of plate 471 to rise initially and then to abruptly drop, due to the interconnection between the left-hand and right-hand sections of tube 446. This sudden drop in potential is converted by the rectifiers and condensers connected to plate 471 to a negative pulse which is delayed with respect to the negative pulse of plate 454.

In a similar manner, additional negative pulses are sequentially produced at plates 485 and 496. The four negative pulses from plates 454, 472, 485, and 496 are respectively applied to the grids of tubes 383, 401, 412, and 415 of the register unit; thereby adding the number 1111, or 15, to the register. This addition effectively subtracts 1 from the number previously stored in the register.

The subtraction unit continues to operate in this manner, subtracting one unit from the register for each pulse applied to line 137 until the number stored in the register reaches 0. When the register stores 0 and another negative pulse is applied to line 137, the register will then indicate the number 15, 1111 in binary form. This means that plates 385, 389, 399, and 409, which are respectively connected through rectifiers 393, 426, 427, and 428 to line 258, are each at a low potential. Lead 258 thus assumes this low potential only for the number 15. Otherwise, the lead is at the highest potential of any of the plates to which it is connected.

Thus, in effect, a negative signal is produced in line 258 whenever the number 15 occurs. This signal reverses the conductive states in flip-flop tube 262 of switching unit 357 effectively interchanging the connections between lines 136 and 137 to register unit 138 and subtraction unit 140. At the same time that flip-flop tube 262 is changed by the negative signal produced in line 258, the number 2 is added to register unit 138 to change the number stored in that unit to 15 to 1. This addition is effected by means of a signal applied to grid 404 through lead 419 and rectifier 429 interconnecting that grid and line 258.

One difficulty which may arise during the subtraction process is that the number 15 may appear in the register temporarily as pulses are passing from subtracting unit 140 to register unit 138. The function of blocking unit 146 is to prevent the existence of such a transient number 15 from causing improper activation of tube 262 and reversing solenoid SR.

Specifically, blocking unit 146 receives an input signal from plate 454 in the subtracting unit. This lead causes tube 506 to change conductive states whereby plate 511 becomes positive. That plate is connected to line 258 through rectifier 517 and is thereby effective to maintain a positive potential in line 258 until a signal pulse from the subtraction unit is applied to grid 518 of tube 506 through lead 505. This pulse causes the tube to return to its original conductive state and permits the potential in line 258 to drop if the number 15 appears in the register after all four pulses have been received from subtracting unit 138.

*Stitch spacing control circuit*

As explained above, the function of the stitch spacing control circuit is to control the tape punch device so that the tape is punched to cause a set of coordinate movements whenever the tracing head, or stylus, has been shifted over the pattern in such a manner that the hypotenuse formed by the "X" and "Y" components of movement is equal to the desired stitch length.

Figure 9:
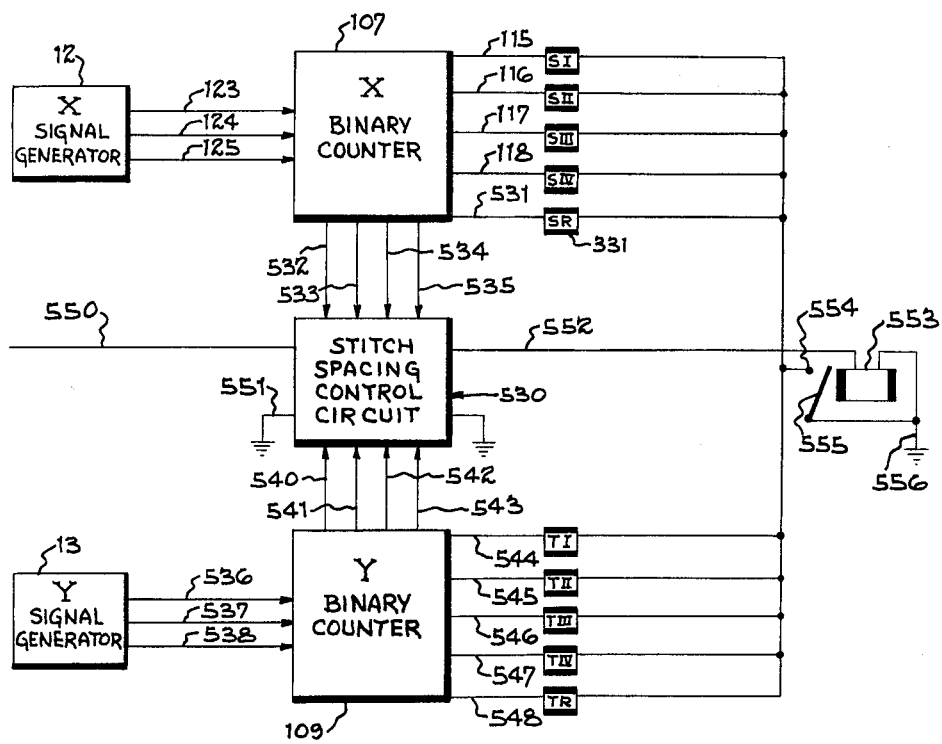
FIGURE 9 is a schematic circuit diagram of the tape punching control circuit.

The construction and operation of the stitch spacing control circuit 530 can best be explained by reference to FIGURES 9–13. As shown in FIGURE 9, "X" coordinate signal generator 12 is connected through leads 123, 124 and 125 to "X" binary counter 107. The "X" binary counter has two sets of output leads. Leads 115, 116, 117, 118 and 531 are respectively connected to solenoids SI, SII, SIII, SIV, and SR of the tape punching apparatus. Leads 532, 533, 534 and 535 provide an input from the "X" binary counter to the stitch spacing control circuit. These latter leads carry the same signals respectively as leads 115, 116, 117 and 118.

Similarly, "Y" coordinate signal generator 13 is connected through leads 536, 537, and 538 to the "Y" binary counter 109. This counter is, in turn, connected to the stitch spacing control circuit through leads 540, 541, 542, and 543. A second set of output leads 544, 545, 546, 547 and 548 interconnect the "Y" binary counter and solenoids TI, TII, TIII, TIV and TR of the tape punching device.

A power supply for the stitch spacing control circuit is connected to line 550, a ground return being provided at 551. The stitch spacing control circuit provides an output signal in line 552 for actuating tripping relay 553. One contact 554 of this relay is connected to a lead of solenoid coils SI, SII, SIII, SR, TI, TII, TIII, TIV and TR in the tape perforating device; while movable contact 555 of the relay is grounded as at 556. Consequently when the tripping relay is closed these tape punching solenoids which are connected to a voltage source by the binary counters will be energized to punch instructions for one set of coordinate movements on the tape.

In general, the stitch spacing control circuit is effective to energize tripping relay 553 whenever the hypotenuse length of the "X" coordinate movement and the "Y" coordinate movement, as indicated by the number of units stored in the binary counters, equals a predetermined length. Whenever relay 553 is energized, a circuit is completed through the punching solenoids conditioned for energization by the binary counters. Also, a signal is applied to each of the binary counters to reset the counters to 0; and a signal is sent back to the solenoid in the tracing mechanism so that the pattern is punched as explained previously. In the embodiment shown, the signal to the binary counters is a negative signal applied to B+ line 386 in register unit 138, which signal momentarily reduces the potential in this line to reset the register to 0.

Figure 11:
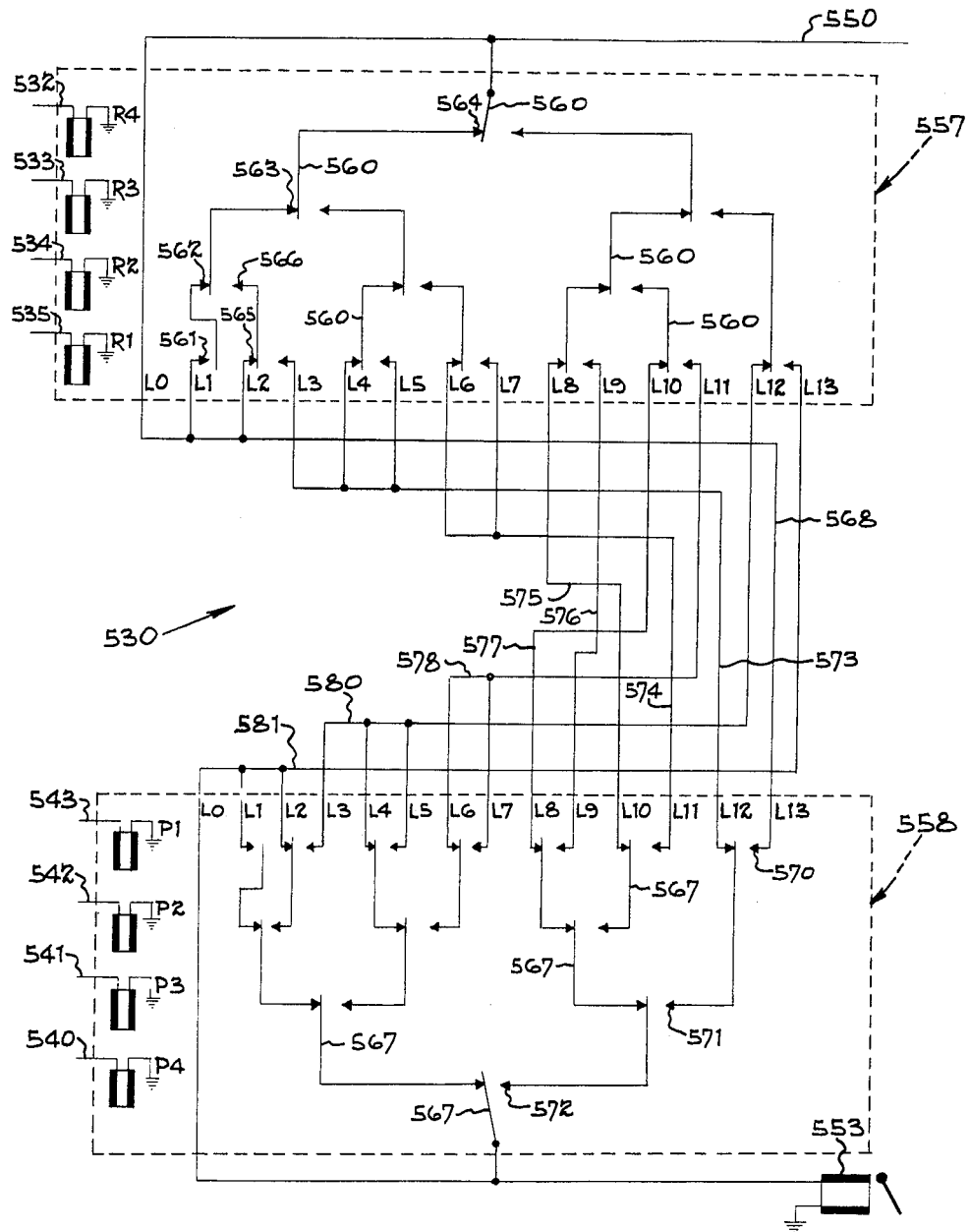
FIGURE 11 is a schematic circuit diagram of a stitch spacing control circuit, including X and Y component coding circuits.

FIGURE 11 shows a stitch spacing control circuit 530 adapted to complete a circuit to tripping relay 553 whenever the increments of movement along the coordinate axes result in a hypotenuse length of substantially 13 units. This circuit is thus adapted to actuate the tripping relay whenever one of the combinations of "X" and "Y" increments in Table I is present.

More particularly, as shown in FIGURE 11, stitch spacing control circuit 530 comprises an "X" decoding unit 557 and a "Y" decoding unit 558. Each is provided with 14 output lines identified by the symbols L0–L13. A circuit is completed to one of these lines in each unit in accordance with the number stored in the binary counter 107 or 109 associated with the unit. As explained above, the number stored in each of the binary counters represents the net number of increments moved by the tracing head along one of the coordinate axes. The output lines of each of the decoders are joined together in such a manner that a circuit is completed from power line 550 to tripping relay 553 whenever one of the combination of "X" and "Y" increments given in Table I occurs.

"X" decoding unit 557 comprises a series of cascaded, or pyramided, contacts 560 actuated by relays R1, R2, R3, and R4. The contacts in each horizontal row are actuated simultaneously upon energization of the relay associated with that row. When energized, relays R1, R2, R3, and R4 correspond respectively to the binary numbers 0001, 0010, 0100, and 1000. The contacts within each decoding unit are arranged in conventional fashion, so that when the number 1 is stored in the binary counter, relay R1 is energized to close contacts 561 and complete a circuit to L1 through contacts 561, 562, 563, and 564. Similarly, when the number 2 is present in the register, only relay R2 is energized so that a circuit is completed to line L2 through contacts 565, 566, 563, and 564. Circuits to lines L3–L13 are similarly completed whenever a corresponding number is present in the register.

"Y" decoder 558 is of identical construction with the "X" decoder unit and includes a series of relays P1, P2, P3, and P4 energized by lines 540–543. These relays control a plurality of contacts 567 which contacts are effective to complete a circuit to one of the lines L0–L13 corresponding to the number stored in the "Y" binary counter.

Lines L1 and L2 of "X" decoder 557 are connected through lead 568 to line L13 of "Y" decoder 558. Thus, whenever a circuit is completed through the "Y" decoder to line L13 through contacts 570, 571, 572; and a circuit is completed through the "X" decoder to either line L1 or L2, current flows through the stitch spacing control circuit from power line 550 to tripping relay 553.

In a similar manner, lines L3, L4, and L5 of the "X" decoder 557 are connected to line L12 of "Y" decoder 558 through lead 573. Lines L6 and L7 of the "X" decoder unit are connected through lead 574 to L11 of the "Y" decoder unit. Lines L8, L9, and L10 of "X" decoder 557 are respectively connected to lines L10, L9, and L8 of "Y" unit 558 through conductors 575, 576, and 577. Another connection is made between line L11 of "X" unit 557 and lines L6 and L7 of "Y" unit 558 through lead 578. Line L12 of "X" unit is joined to lines L3, L4, and L5 of "Y" unit 558 through conductor 580; and line L13 is joined to lines L1 and L2 of the "Y" unit through line 581. Thus, it can be seen that if any of the combinations of "X" and "Y" increments shown in Table I occurs, a circuit is completed through the stitch spacing circuit.

Figure 12:
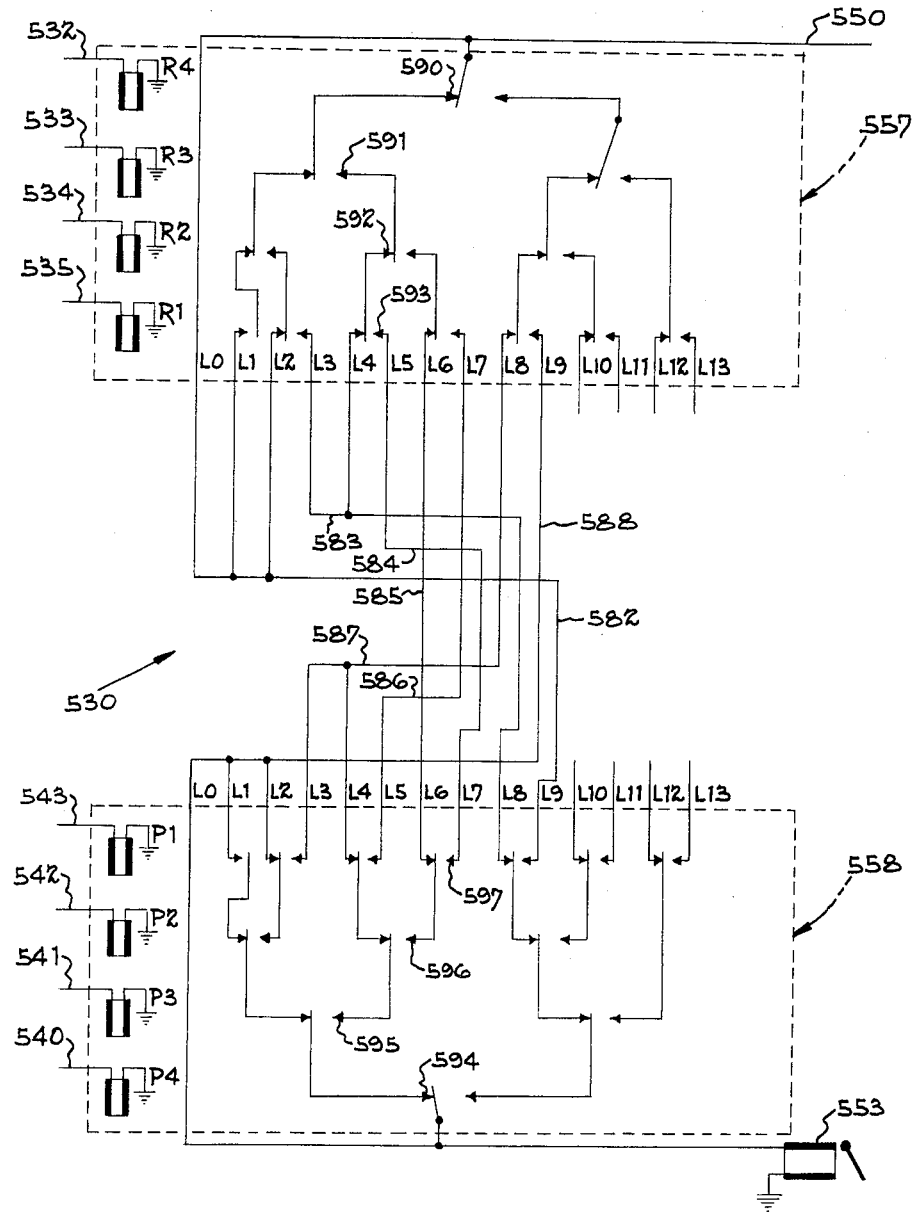
FIGURE 12 is a schematic circuit diagram similar to FIGURE 11 showing the manner in which the stitch spacing control circuit is adjusted to vary the stitch spacing.

FIGURE 12 shows the manner in which the stitch spacing circuit 530 is modified to obtain a shorter stitch spacing. Table II below contains the various combinations of "X" and "Y" incremenal movements provided for in this modification, and gives the corresponding stitch lengths based on .005" increments.

TABLE II

| "X" Increments | "Y" Increments | Hypotenuse Length |
| --- | --- | --- |
| 0 | 9 | .045" |
| 1 | 9 | .0453 |
| 2 | 9 | .0461 |
| 3 | 8 | .0428 |
| 4 | 8 | .0447 |
| 5 | 7 | .0431 |
| 6 | 6 | .0425 |
| 7 | 5 | .0431 |
| 8 | 3 or 4 | .0428 |
| 9 | 0, 1or 2 | .045 |

It is to be understood that the stitch spacing control circuit of FIGURE 12 includes an "X" decoding unit 557 and a "Y" decoding unit 558 which are identical with the corresponding units in FIGURE 11. However, in the modified circuit shown in FIGURE 12 only output leads L0–L9 of the "X" and "Y" decoder units are employed.

As shown, lines L0, L1, and L2 of "X" unit 557 are connected through lead 582 to line L9 of the "Y" unit. Lines L3 and L4 of the "X" unit are similarly connected by means of lead 583 to line L8 of the "Y" unit. Lines L5, L6, and L7 of the "X" unit are respectively joined to lines L7, L6, and L5 of the "Y" unit through conductors 584, 585, 586. Lines L8 and L9 of "X" unit 557 are respectively joined through leads 587 and 588 to output lines L3 and L4 and output lines L0, L1, and L2 of "Y" unit 558.

The mode of operation of the modified circuit is the same as the circuit of FIGURE 11. For example, if a circuit is completed to L5 in "X" unit 557 through contacts 590, 591, 592, and 593; and a circuit is completed to L7 of "Y" unit 558 through contacts 594, 595, 596, and 597, a conductive path is completed from power line 550 to tripping relay 553.

In a similar manner the number of increments in the hypotenuse length can be increased by increasing the number of relays, contacts, and output leads in each of the decoding units. If the distance corresponding to one increment is reduced, to .002" for example, the total hypotenuse length can be kept the same; while the variation in hypotenuse length resulting from different combinations of component movements is also reduced.

*Record punching apparatus*

Figure 10:
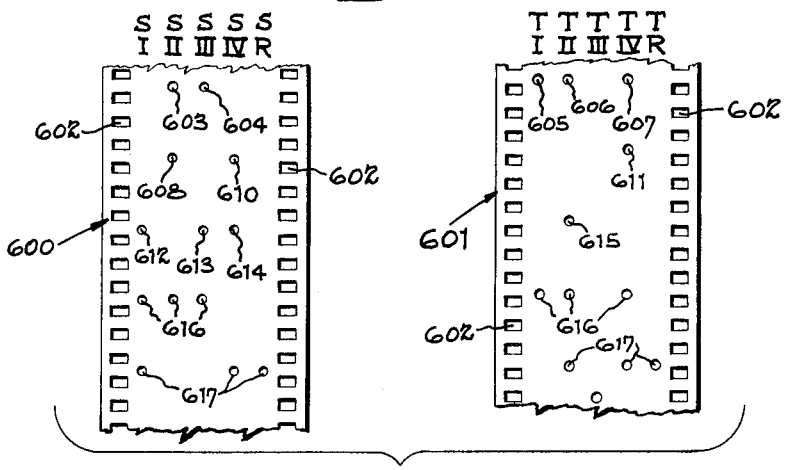
FIGURE 10 is an enlarged view of two segments of tape punched in correspondence with the movements required to reproduce the pattern of FIGURE 8.

As previously stated, the various movements of the tracing unit from one stitching position to the next are recorded on a suitable record medium such as a metal, paper or cellulose tape. One suitable form of tape is shown in FIGURE 10. As there shown, two separate tapes 600 and 601 are provided; tape 600 being used to control movements along the "X" coordinate axis and tape 601 being used to control movements along the "Y" axis. Obviously a single tape having ten columns could be used in place of the two five column tapes shown. Each tape is provided with one or more columns of equally spaced perforations 602 adapted to engage teeth of suitable sprocket wheels by means of which the tape is fed through the punching and reading mechanisms.

Each movement of the work holding platen is controlled by one transverse set of apertures formed in the tapes. In the embodiment shown, these movements are controlled by ten columns of punched apertures; each transverse row, or set of signals, comprising either ten punched apertures, no punched apertures, or a combination of punched apertures and unpunched areas. The record punching mechanism will not be described in detail since its construction is conventional forms no part of the present invention.

We have found that one form of record punching mechanism especially well suited for the present application is produced by Commercial Controls Corporation, for use in conjunction with their Fexowriter Model FPC–8A. A record punching device of this type is also disclosed in Blodgett Patent No. 2,700,446. Basically, the record former included means for advancing the tape in a step by step movement past a punching station. At the punching station, a plurality of, transversely aligned, reciprocal punches are provided. In the embodiment shown, there are ten punches equispaced transversely of the tapes.

Two controls are provided for controlling the punch operation. In the first place, each punch has associated therewith a punch selecting solenoid SI–SIV, TI–TIV, SR and TR; and in addition, there is provided an operating or tripping relay 553. In the present embodiment, each of the ten punch selecting solenoids is connected to one of the output leads of the binary counter and the tripping relay is connected to the switch spacing circuit. Thus, the output of the binary counter functions to condition the proper punches for actuation and the stitch spacing circuit controls when the punches are actuated. It will be appreciated that the record punching device is constructed so that the tape is advanced one row subsequent to each energization of the punch operating mechanism.

Two segments of tape 600 and 601 are shown in FIGURE 10 as examples of a record produced by the tape perforating device. These tapes include apertures for effecting platen movements from point 17 to point 18, from point 18 to point 20 and from point 20 to point 21 of the pattern shown in FIGURE 8. In general, the vertical columns of apertures in tape 600 are respectively adapted to store the binary numbers 0001, 0010, 0100, 1000 and the reversing signal. These apertures are formed by punches controlled by solenoids, SI, SII, SIII, SIV, and SR of the tape punching device. The vertical columns from left to right in tape 61 are similarly adapted to store the binary numbers 001, 0010, 0100, and 1000 and the reversing signal. These apertures are respectively formed by punches actuated by the energization of solenoids TI, TII, TIII, TIV and TR in the tape punching apparatus.

More particularly, when the platen is shifted from point 17 to point 18 it must be moved six units in the "X" direction and eleven units in the "Y" direction. As indicated above, the number 6 is represented in binary notation as 0110. This information is stored in the tape by apertures 603 and 604 formed in response to the energization of solenoids SII and SIII. Similarly the number 11 is represented in binary notation by 1011 and is stored in tape 601 by apertures 605, 606, and 607 formed by the actuation of punch solenoids TI, TII, and TIV.

In the same manner, movement from point 18 to point 20 along the pattern requires 10 increments of movement in the "X" direction and 8 increments of movement in the "Y" direction. Directions for movement 10 increments along the "X" axis are stored in tape 600 by apertures 608 and 610; while directions for causing 8 increments of movement in the "Y" direction are stored in aperture 611 and tape 601. Openings 612, 613, and 614 represent the 13 increments of movement in the "X" direction required for shifting the platen between points 20 and 21; and aperture 615 stores the directions for the two increments of movement along the "Y" direction required between these two points.

Apertures 616 and 617 are examples of other movements made in accordance with Table I. Apertures 616 in tape 600 correspond to a movement of 7 units along the "X" axis while apertures 616 in tape 601 represent 11 increments of movement along the "Y" axis. Similarly, apertures 617 correspond to movement of 9 units in the negative direction along the "X" axis; and 10 units in the reverse direction along the "Y" axis. By providing one row of punched apertures for each set of coordinate movements, the tapes are adapted to store directions for shifting the platen to bring the entire pattern beneath the stitching head or other tool. After the tapes have been punched, they are removed from the tape perforating machine and ready for use, as explained below, to control the "X" and "Y" platen drives of the fastening machine.

Having described our invention, we claim:

1. In apparatus for preparing a digital record corresponding to movements along a pattern, the combination of tracing head adapted to follow said pattern, means mounting said tracing head for movement along each of two perpendicular axes, a rack disposed parallel to each of said axes, gear units mounted for movement with said tracing head along each of said axes, each of said gear units including a pinion in driven connection with said rack, electrical signal generators mechancally interconnected with said gear units and adapted to produce electrical signals in accordance with component movements of said tracing head along each of said axes, means carried by said tracing head for punching said pattern in response to an electrical signal, and means having electrical input connections to said electrical signal generators and having an electrical output connection to said punching means for actuating said punching means whenever said tracing head has traversed a preselected length of pattern.

2. In apparatus for preparing a digital record corresponding to a pattern, the combination of a tracing head adapted to track upon said pattern, means mounting said tracing head for movement along each of two perpendicular axes, racks disposed parallel to each of said axes, gear units mounted for movement with said tracing head along each of said axes, each of said gear units including a pinion in driven connection with one of said racks, electrical signal generators mechanically interconnected with each of said gear units for producing signals in accordance with the component movement of said tracing head along each of said axes, each of said signal generators including means generating a pulse for each increment of movement of predetermined length along each of said axes.

3. In apparatus for preparing a digital record corresponding to movements along a pattern, the combination of a tracing head, means for moving said tracing head along each of two perpendicular axes, a rack disposed parallel to each of said axes, gear units connected with said tracing head for movement along each of said axes, each of said gear units including a pinion in driven connection with one of said racks, an electrical signal generator machanically interconnected with each of said gear units for producing said signals in accordance with the component movements of said tracing head along each of said axes, each of said signal generators including means generating a pulse for each increment of movement of predetermined length along each of said axes, said last named means also providing an indication of the direction of movement of said tracing head along each axes.

4. In apparatus for forming a recond corresponding to a desired stitching pattern whereby the stitches are of substantially equal length, the combination of first and second signal generators for producing signals corresponding to the number of increments of the components of said pattern along each of two axes angulated with respect to one another, means for adding and subtracting said signals produced by each of said generators, and a stitch spacing control circuit adapted to provide an output signal when the hypotenuse length of a pair of components correspond to a predetermined pattern length.

5. In apparatus for preparing a digital record on punched tape corresponding to movement of a tracing head over a pattern, said apparatus comprising means for generating electrical signals for each movement of said tracing head along two perpendicular axes, counters for adding the number of pulses generated by said means, a tape perforating device including punches and a tripping relay for actuating said punches, said counters being effective to condition said punches for actuation, a control circuit interconnected to each of said counters and adapted to complete a circuit to said tripping relay when one of a predetermined set of numbers is present in each of said counters.

6. In apparatus for forming a perforated tape punched with instructions for moving work relative to a stitching machine so that the stitching machine stitches the work along a predetermined pattern with substantially uniform stitch spacing, the combination of means for generating electrical signals corresponding to components along each of two perpendicular axes of movement over said pattern, electrical counters for counting the signals, a tape punching mechanism including electrically responsive punches, said counters being effective to condition said punches for actuation, and a stitch spacing control circuit effective to cause actuation of said punches when the counters register one of a set of predetermined pairs of signals.

7. In apparatus for preparing a digital record corresponding to movements along a pattern, the combination of a tracing head, means for moving said tracing head along each of two perpendicular axes, a rack disposed parallel to each of said axes, two electrical signal generators connected with said tracing head for movement along each of said axes, each of said electrical signal generators being effective to produce signals in accordance with the component movements of said tracing head along each of said axes, each of said signal generators being adapted to generate a pulse for each increment of movement of predetermined length along each of said axes, each of said signal generators comprising gear means in driven engagement with said rack and shiftable there along, a rotary output shaft in mechanical interconnection with said gear means, a disc member mounted for rotation with said shaft, said disc member having apertures formed therein along the peripheries of three concentric circles, the apertures on each periphery being equally spaced about said periphery and being angularly offset with respect to each of the apertures formed on each of the other peripheries, light sources disposed for registration with the apertures on each of said peripheries, and light responsive signal generator elements disposed on the opposite side of said rotary disc from said light source, the signals generated by each of said generators also providing an indication of the direction of movement of said tracing head along each axes, and counters for adding the number of signals generated by each of said generators, and record punching means actuated when one of a predetermined set of numbers is present in said counters.

References Cited by the Examiner

UNITED STATES PATENTS

| | | | |
|---|---|---|---|
| 2,207,787 | 7/40 | Eberle. | |
| 2,336,581 | 12/43 | Young. | |
| 2,522,851 | 9/50 | Tyrner. | |
| 2,618,860 | 11/52 | Engelhart. | |
| 2,649,065 | 8/53 | Casper | 112—84 |
| 2,781,848 | 2/57 | Thomas | 234—75 X |
| 2,826,252 | 3/58 | Dickstein | 234—60 |
| 2,827,963 | 3/58 | Anders | 234—60 |
| 2,935,619 | 5/60 | Rodgers | 250—333 |
| 2,941,088 | 6/60 | Mahaney | 250—333 |
| 2,920,249 | 1/60 | Gratzert | 317—140 |
| 2,972,089 | 2/61 | Jackel | 317—140 |
| 3,022,501 | 2/62 | Seigle. | |

ANDREW R. JUHASZ, *Primary Examiner.*

JOHN C. CHRISTIE, J. SPENCER OVERHOLSER, *Examiners.*